UNITED STATES PATENT OFFICE.

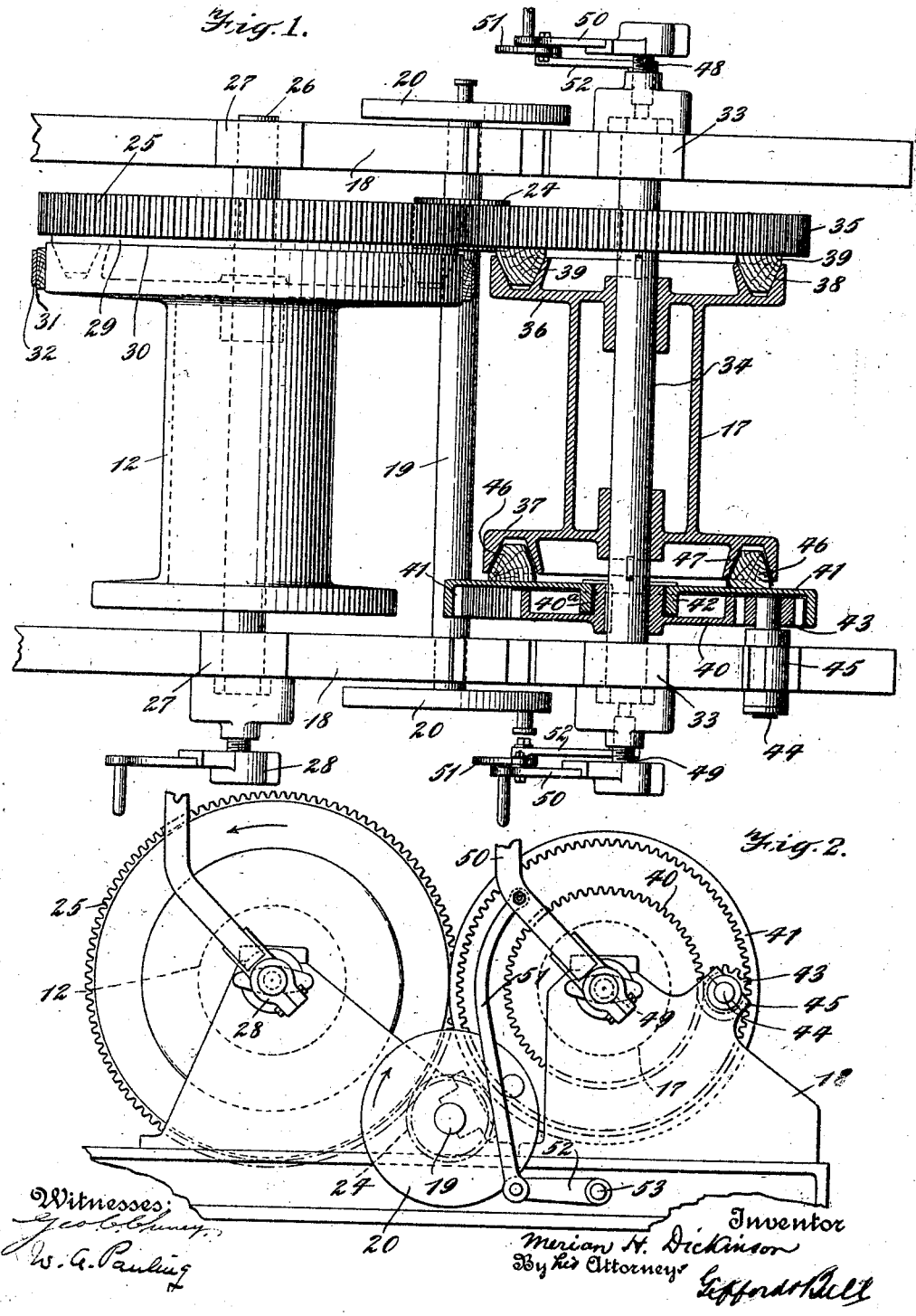

MERIAN H. DICKINSON, OF SEATTLE, WASHINGTON, ASSIGNOR TO LIDGERWOOD MANUFACTURING COMPANY, OF NEW YORK, N. Y., A CORPORATION OF NEW YORK.

HOISTING AND CONVEYING MEANS.

1,200,712. Specification of Letters Patent. Patented Oct. 10, 1916.

Application filed December 5, 1912. Serial No. 735,095.

*To all whom it may concern:*

Be it known that I, MERIAN H. DICKINSON, a citizen of the United States, residing at Seattle, in the county of King and State of Washington, have invented certain new and useful Improvements in Hoisting and Conveying Means, of which the following is a specification.

My invention relates to new and useful improvements in hoisting and conveying means, and more particularly to drum engines for operating the lines of hoisting apparatus and cable ways.

The invention consists in the improvements and combination of parts to be fully described hereinafter, and the novelty of which will be particularly pointed out and distinctly claimed.

I have fully and clearly illustrated my invention in the accompanying drawings to be taken as a part of this specification and wherein:

Figure 1 is a plan view, partly in horizontal section, of the drum portion of the hoisting and conveying engine. Fig. 2 is a view in side elevation of the structure shown in Fig. 1.

Mounted in suitable bearings in parallel side frames 18, which are spaced apart from each other, is a horizontally-disposed power shaft 19, carrying on its opposite ends crank disks 20, connected by pitmen 21, with the piston rods 22, of the power cylinders 23, of a steam engine, whereby said power shaft is driven in the direction of the arrow, as shown in Fig. 3. Keyed to the power shaft 19, is a driving pinion 24, which meshes with a large driving gear 25, which is keyed to a drum-shaft 26 journaled in bearings 27 on the side frames 18, said shaft 26 running parallel to the said power shaft 19. This shaft 26 carries the inhaul drum 12, heretofore mentioned, which is arranged to revolve freely on said shaft independent of the latter and to have movement longitudinally thereof toward and away from the gear 25, screw-thrust means 28, of well known construction, being preferably employed for effecting said longitudinal movement of the drum 12. Friction clutch means is employed for connecting the drum 12, with the gear 25, which may consist of a friction clutch member 29, on the gear 25, adapted to coöperate with a friction clutch member 30, on the adjacent head of the drum, so that, when the drum is moved toward the gear 25, driving connection between the two will be made, while movement of said drum away from the gear will break the driving connection to permit the shaft 26, to revolve independently of the drum, or the drum to revolve free from the shaft. The flange of the drum adjacent the gear 25, may be provided with a circumferential braking face 31, with which coöperates a band brake 32, in a well known manner.

Journaled in bearings 33, in the side frame members 18, and in advance of the power shaft is a second drum-shaft 34, upon which is keyed a large driving gear 35, normally in mesh with the gear 25, heretofore described, so that said gear 35, is driven from the power shaft 19, through the pinion 24, and said gear 25. This shaft 34, carries the drum 17, heretofore mentioned, which is mounted on said shaft for revolution independently thereof and for movement longitudinally of the shaft, said drum having end flanges 36, 37, the former of which is provided on its face adjacent the gear 35, with friction contact surface 38, to coöperate with friction blocks 39, carried by the gear 35, whereby driving connection may be made between the gear 35, and the drum 17, to drive the latter in the opposite direction from the drum 12, when the latter is connected to its driving gear 25.

I provide improved means whereby the direction of revolution of the drum 17, may be reversed from that just described without reversal of the driving shaft 19. This means preferably, although not necessarily, consists of a gear 40, keyed to the shaft 34, adjacent the flange 37, on said drum and a larger internal gear 41, having its hub 42, rotatably mounted on the hub 40ª, of the gear 40, as clearly shown in Fig. 2 of the drawings. Driving connection is made between the gear 40, and the internal gear 41, by means of a pinion 43 mounted on a stub shaft 44, journaled in a bearing 45, on one of the side frames 18. The gear 41, is provided with friction clutch blocks 46, adapted to coöperate with a friction clutch surface 47, on the outer face of the flange 37, of the drum 17. The arrangement of the gears 35, and 41, with the respective clutch means between said gears and the flanges of the drum 17, is such that, when the drum is moved lengthwise of the shaft in one direction, said drum will be coupled to the gear 41, and disconnected from the gear 35, while, when the drum is moved in the other direction, it will be disconnected from the gear 41, and connected to the gear 35.

Any suitable means may be employed for moving the drum 17, endwise of the shaft 34, but I prefer to employ the usual screw-thrust means 48, 49, the threads of which are reversed relative to each other and the operating levers 50 of which are connected by connecting rods 51, to arms 52, on a cross shaft 53, the latter having bearing in the main frame, so that, when one of the levers 50, is operated to apply the thrust at one end of the drum to connect the friction surfaces at the opposite end, the thrust at said opposite end will be relieved to permit the application of the friction.

It will be understood that the pinion 24, and gears 25, 35 are so proportioned relative to the diameters of the drums 12, and 17, that, when the drums 12, and 17, are connected to the gears 25, and 35, respectively, the peripheral speed of the two drums will be equal, but I prefer to so proportion the gear 40, internal gear 41, and intermediate gear 43, that, when the drum 17, is connected to the gear 41, the peripheral speed of revolution of the drum 17, will be greater than when it is revolved in the opposite direction.

What I claim and desire to secure by Letters Patent of the United States is:

In a hoisting engine, a shaft, a gear on said shaft, a drum on the shaft adapted to be clutched to said gear by movement of the drum longitudinally of the shaft, a power shaft carrying a gear meshing with said first-named gear, a third shaft, a gear on one end of said third shaft meshing with the gear on said first-named shaft, a gear fast on the opposite end of said third shaft and having a hub, a clutch member rotatably mounted on said hub and having an internal gear surrounding said last-named gear, a pinion connecting said last-named gear and said internal gear, a drum on the third shaft between said first-named gear thereon and the clutch member, and means for connecting said last-named drum either to the first-named gear on said third shaft or said clutch member.

In testimony whereof I have hereunto signed my name in the presence of two subscribing witnesses.

MERIAN H. DICKINSON.

Witnesses:
M. E. McNINCH,
C. G. HEYLMUN.